United States Patent Office 3,761,441
Patented Sept. 25, 1973

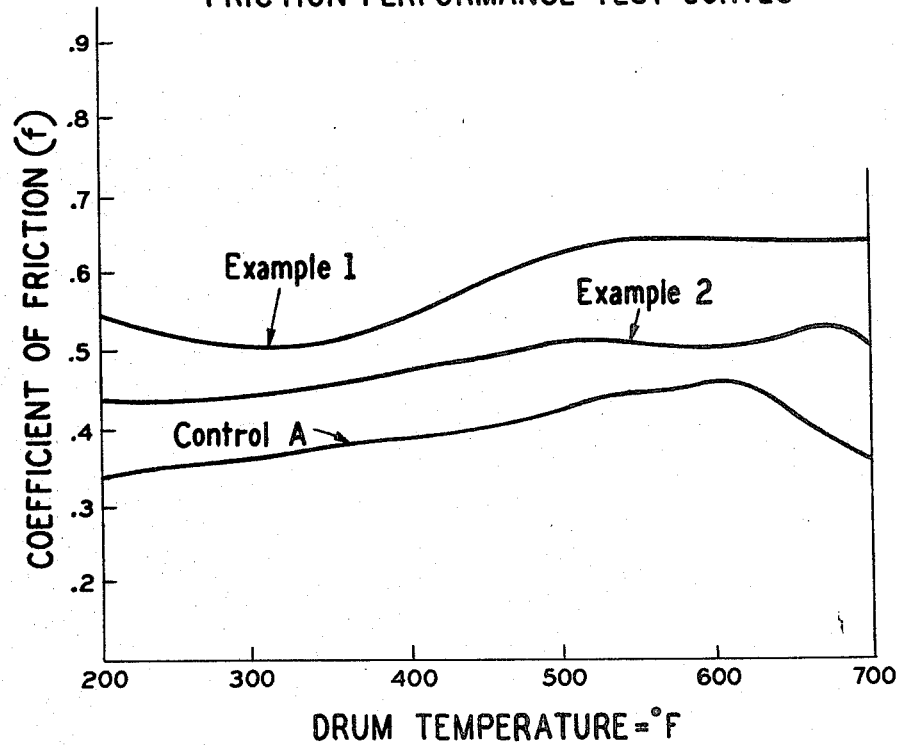

---

3,761,441
THERMOSETTING FRICTION COMPOSITIONS AND FRICTION ELEMENTS THEREOF CONTAINING AN ACRYLIMIDE RESIN
William J. D'Alessandro, East Brunswick, and George L. Brode, Somerville, N.J., assignors to Union Carbide Corporation, New York, N.Y.
Continuation-in-part of abandoned application Ser. No. 199,444, Nov. 17, 1971. This application Feb. 2, 1972, Ser. No. 222,980
Int. Cl. C08g 51/10, 51/12
U.S. Cl. 260—37 N      15 Claims

ABSTRACT OF THE DISCLOSURE

Thermosetting friction compositions have been developed by combining particulate friction materials with thermosetting binders consisting of either an arylimide resin alone or a combination of an arylimide resin and a phenol-aldehyde condensation resin.

---

This is a continuation-in-part of Ser. No. 199,444 filed Nov. 17, 1971, now abandoned.

BACKGROUND OF THE INVENTION

This invention pertains to thermosetting friction compositions and friction elements fabricated from them. More particularly it pertains to blends of particulate friction materials and thermosetting binders formulated from an arylimide resin alone or a mixture of an arylimide resin with a heat hardenable phenolic resin.

Friction elements which are intended for heavy duty brake or clutch operations in motor vehicles must withstand severe service conditions. They are often subjected to repeated and prolonged braking or clutching operations which develop high temperatures above 500° F. in the friction elements. These high temperatures tend to depolymerize or otherwise decompose the organic binder materials heretofore employed as the principal essential ingredients of the binders in the friction elements. Decomposition of the friction material results in the formation of gaseous or liquid products of heat decomposition. In some cases this causes marked softening of the friction element with consequent loss of braking efficiency. In other cases, the depolymerized products of heat decomposition appear on the friction surface of the friction elements or within them producing after vigorous braking applications, a condition referred to by automotive engineers as "lining fade."

In many instances, the aforesaid liquified decomposition products may produce a glaze on the surface of the friction element. This glaze must be removed by subsequent braking or clutching operations to restore the original surface condition of the element. If subsequent operations are unable to eradicate the glaze, the friction element will remain at a low level of friction and yield an unsafe functioning of the device in which it is used. Moreover, the aforesaid decomposition may in some instances cause an excess of abrasive material of the lining composition to be present on the friction surface generating a condition known as "over recovery," the friction element then having a co-efficient of friction upon cooling exceeding that which the friction element originally possessed. Since it is desirable to maintain the stability of friction characteristics of the friction elements, it will be understood that these conditions are to be minimized or avoided completely.

A further problem heretofore associated with known friction elements has been the impossibility of achieving a relatively high level of substantially uniform friction action over a wide temperature range of the friction element. By high level of friction we mean a coefficient of friction above about 0.4 as defined on pp. 39–45 of Marks' Mechanical Engineers Handbook, 6th edition, McGraw-Hill Book Co., New York, N.Y. (1958). This property, desired in modern brake and clutch operations, can be made more effective if the friction elements possess this feature. It will be understood for instance that for braking stops made at the same speed and at the same rate of deceleration, a friction material which possesses a high level of friction action and which is capable of maintaining the same over a wide temperature range will provide more positive response and will require a lower pedal effort than would be the case of a conventional friction material possessing neither a uniform level of friction action nor a high friction ability over a substantial temperature range.

It is therefore an object of this invention to provide new heat resistant resin binders which will upgrade a friction element friction level and fade resistance at elevated temperatures.

Another object of this invention is to provide a friction composition resin binder which can be processed in conventional hot molding equipment without extended over post cures which are normally required for conventional thermosetting phenolic resin binders.

Still another object is to provide a friction composition resin binder possessing good melt flow in the temperature range of about 150–200° C. in order to provide good wetting of the particulate friction material and other components of the mixture.

Another object is to provide a thermosetting friction composition which releases no volatile upon cure and cures with a minimum of blistering, cracking or distortion.

Other objects will become apparent to those skilled in the art upon a further reading of the specification.

SUMMARY OF THE INVENTION

Friction elements meeting the above enumerated objects can be formed from thermosetting friction compositions comprising a major portion by weight of particulate friction materials, a binding amount of a thermosetting arylimide binder having the formula:

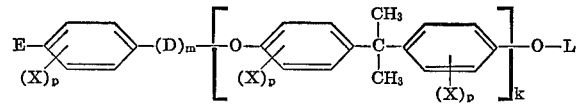

wherein D is a radical selected from the group consisting of

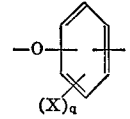

or

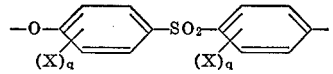

wherein L is a radical selected from the group consisting of

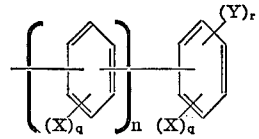

or

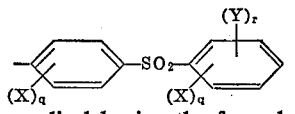

wherein Y is a radical having the formula:

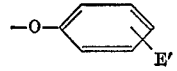

wherein each of E and E' is a monovalent radical selected from the group consisting of:

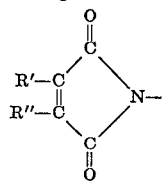

or

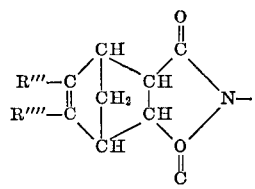

wherein
each of R', R'', R''', and R'''' is a monovalent radical selected from the group consisting of H, lower alkyl or Cl,
$m$ is an integer having values of 0 to 5,
$k$ is an integer having values of 0 to 1,
X is a halogen selected from the group consisting of F, Cl or Br,
each of $q$ and $p$ is an integer having values of 0 to 4 and $r$ is 1 with the proviso that $q+r \not> 5$, and
$n$ is an integer having values of 0 to 3, and 0 to about 40% by weight of phenol-aldehyde condensation resin based on the total weight of thermosetting friction composition.

DESCRIPTION OF THE INVENTION

The use of the phrases, "thermosetting friction composition" and "friction element" as used herein and in the appended claims, is intended to be descriptive of that class of compositions and elements used to develop a high coefficient of friction when applied against a surface without substantially cutting, wearing away or rubbing off that surface but which are designed to gradually wear away in use to maintain the original surface conditions of the friction composition and element. For this reason, the major portion of the particulate friction material cannot be harder than the surface against which the friction compositions and elements of this invention are applied.

It is preferred that the particulate friction material be heat resistant and essentially composed of filamentous and granular friction materials. Best results are obtained when the filamentous ingredients predominate and constitute at least about 50% by weight of the friction material. In this connection, long, medium or short asbestos fibers such as chrysotile asbestos are preferred for desirable high heat resistant handling and reinforcing properties. Moreover, best braking performance is obtained when the particulate materials are inorganic in character although a substantial portion may be organic when in a form heat-treated to render them substantially infusible at temperatures of 600° F. and preferably higher. Normally, it is preferred not to use organic particulate ingredients in amounts exceeding about 30% by weight of the friction material and not more than about 5 to about 10% when such materials have not been heat-treated as aforesaid.

Examples of filamentous particulate materials which may be used include inorganic fibers such as asbestos fibers, steel wool, bronze fiber, glass fiber, and calcium silicate fiber; organic fibers such as cellulose fiber; and synthetic fibers such as polyacrylonitrile fiber, polyethylene terephthalate fiber; and synthetic resin fibers of these types, heat treated to render them infusible at temperatures of 600° F. and higher.

Suitable asbestos fibers have a grade of 1–9, preferably 3–7, as graded by the Quebec screen test (Ross, J. G., Canadian Department of Mines, Mines Branch No. 707, 50–51 (1931)) as revised Dec. 1, 1942. Other filamentous friction materials can be graded by this test.

Additional particulate friction materials conventionally used in friction compositions can also be present in the compositions and elements of this invention. Such materials are employed to increase density, to adjust the thermal properties, and to fortify and/or control friction. Still other materials can be used to impart special properties such as for example, resistance to moisture sensitivity, wear and noise.

Examples of other particulate friction materials include barium sulfate, cork dust, silica, mica, metal particles, litharge, clay, calcium oxide, zinc oxide, rotten stone, zinc dust, Alundum, graphite, molybdenum disulfide, iron oxide and organic friction materials such as rubber dust and Cardolite NC111 friction fortifying particles (an aldehyde-cashew nut shell liquid condensation product sold by Minnesota Mining and Manufacturing Company). The cashew nut shell liquid, believed to have the formula:

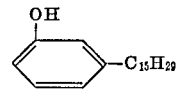

is reacted with an aldehyde and heat cured to an infusible state and then comminuted to a granular material as described in U.S. Pat. No. 2,317,587.

The particulate friction materials of the improved friction compositions and friction elements of this invention can be employed in amounts normally used in conventional friction compositions and friction elements. For example, friction materials as defined herein are employed in major amounts by weight, that is amounts ranging between about 51 to about 95% by weight, based on the weight of the total composition.

The preparation of the preferred arylimides used as binders in this invention, viz., those wherein the monovalent radicals E and E' are

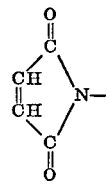

may be illustrated by the condensation of a diamine with maleic anhydride as shown below.

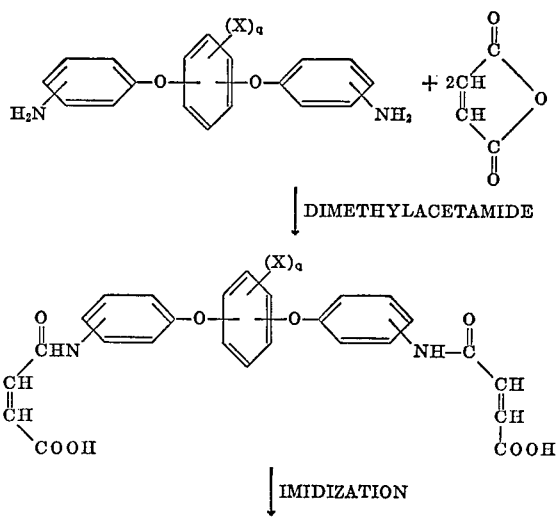

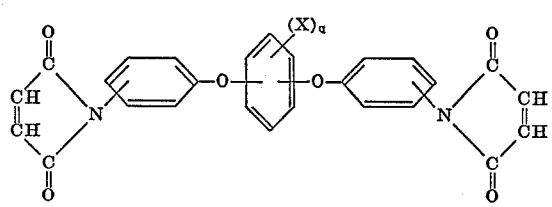

Preferred species of those arylimides where E and E' are each:

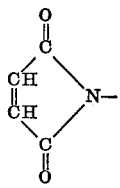

include the following:

(1) Oligomer polysulfone bis(maleimides) having the idealized formula:

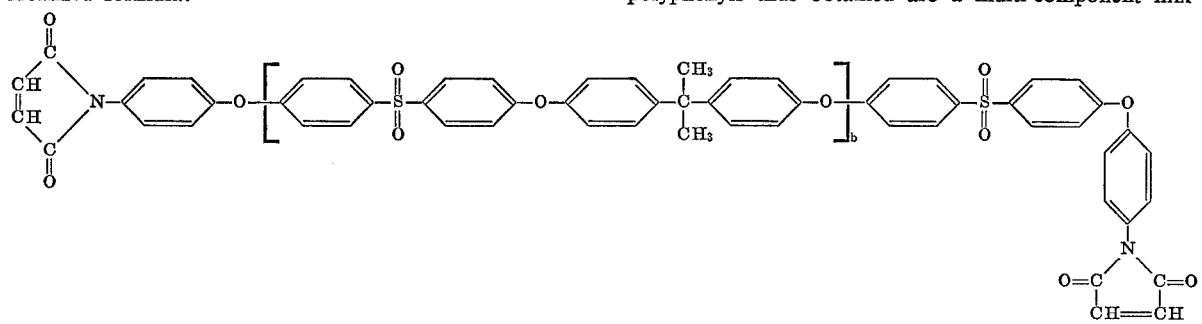

(2) Oligomer polyphenylene ether maleimides having the idealized formula:

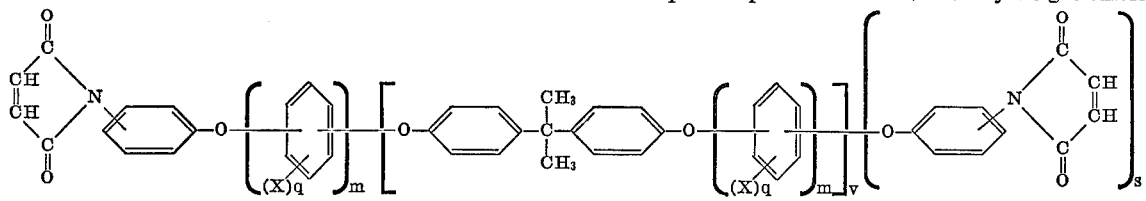

(3) Polyphenylene ether maleimides having the idealized formula:

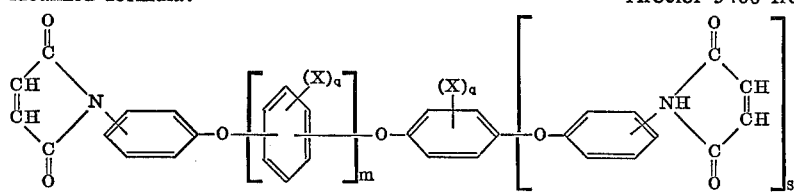

(4) Arylether maleimides having the idealized formula:

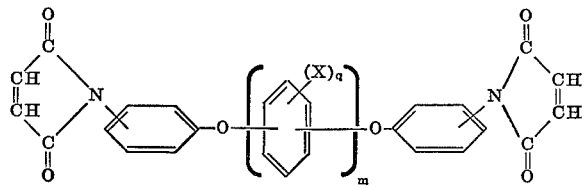

(5) Oligomer arylether bisphenol A maleimide having the idealized formula:

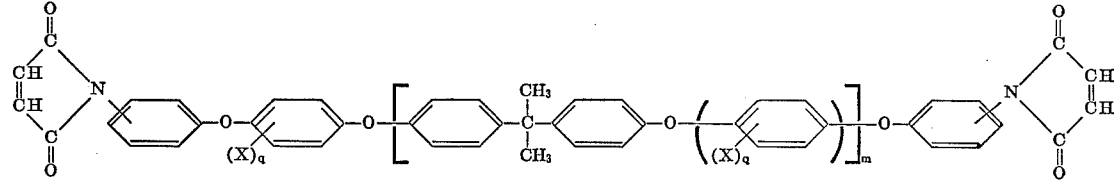

wherein $b$ and $s$ are integers having values of 0 to 2,
X is a halogen and preferably chlorine,
$q$ is an integer having values of 0 to 4 and is preferably 4,
$m$ is an integer having values of 0 to 5 and $v$ is a rational number having values of 1 to about 2.

Especially preferred species of the oligomer polysulfone bis(maleimides) depicted in Formula 1 above are those having molecular weights of about 600, 1000, 1500 and 2500.

Preferred species of the oligomer polyphenylene ether maleimides of Formula 2 or 3 above are those where $m$ is 3. Those maleimides represented by Formula 2 can be readily prepared by first preparing polyamines by condensation of the sodium salt of p-aminophenol with a halogenated, preferably chlorinated, polyphenyl in a highly polar solvent such as dimethylsulfoxide or dimethylformamide or N-methylpyrrolidinone followed by recovery of the product by coagulation from water. The chlorinated polyphenyls thus obtained are a multi-component mixture. For example, condensation of three moles of sodium p-aminophenolate with a 60% by weight chlorinated terphenyl (commercially available under the trademark Aroclor 5460 from Monsanto Chemical Co.) afforded a product with a titrated amine equivalent weight of 281.

Other useful halogenated benzenes which can be used in this invention include any of the bromo or fluoro derivatives of benzene, diphenyl, terphenyl, tetraphenyl, and the like.

One can also use thermosetting arylimides where the monovalent radicals E and E' are derived from amines and Nadic anhydride (a trademark of the National Aniline Division of Allied Chemical Corp. for endo-cis-bicyclo[2.2.1]hept - 5 - ene-2,3-dicarboxylic anhydride) instead of maleic anhydride. Nadic anhydride is commercially available and can be prepared by the reaction of maleic anhydride with cyclopentadiene (Diels and Alder, Annalen, p. 98, vol. 460, 1928). Nadic anhydrides containing substituents R''' and R'''', identified above, can be similarly synthesized.

A binding amount of the thermosetting arylimide binder, that is, an amount sufficient to bind together the particulate friction material will depend on the amount of friction material used, and the kinds and numbers of components present in the friction material. Generally, binder amounts falling within the range of from about 5 to about 49% by weight based on the total thermosetting friction composition are suitable although ranges of about 10 to about 25 percent by weight are preferred.

While it is preferred to cure the instant thermosetting frictional composition into friction elements, by heat alone, where it is desired the rate of cure can be increased by incorporating minor amounts of accelerators into these compositions. Suitable accelerators include peroxides, such as, benzoyl peroxide, cumene hydroperoxide, dicumyl peroxide, or di-tertiary butyl peroxide, methylene dianiline, phenol, styrene, divinyl benzene, furfuryl alcohol, and the like.

While it is preferred to employ only a thermosetting arylimide as the binder in this invention where maximum performance of the friction elements derived from the friction compositions is of paramount importance, one can for economical or other reasons also include phenol-aldehyde condensation resin binders in said friction composition. If phenol-aldehyde condensation resins binders are so included, one can use as little as about 1% by weight based on the total weight of the thermosetting frictional composition. Preferred amounts of phenol-aldehyde condensation resin binders lie in the range of about 10% to about 25% or about 5% to about 30% based on the total weight of the thermosetting frictional composition.

The term "phenol-aldehyde condensation resin" herein refers to an acid or base catalyzed thermosetting resin of the resole or novolak type prepared from a phenol such as phenol, cresol, xylenol, para-t-butylphenol, para-phenylphenol, bisphenols and resorcinol together with an aldehyde such as formaldehyde, acetaldehyde, furfural and the like, such as described in U.S. Pat. 2,585,196 to Walton, U.S. Pat. 2,475,587 to Bender et al., U.S. Pat. 2,557,922 to Mazzucchelli et al., U.S. Pat. 2, 617,785 to Pritchett et al., U.S. Pat. 2,675,335 to Rankin et al., and U.S. Pat. 2,552,025 to Barr et al.

The novolak resins are two-step acid-catalyzed phenolic resins which require the use of hardeners to effect cure in conjunction with heat. These hardeners are methylene engendering agents such as formaldehyde in any form, e.g., a para form or trioxane or compounds containing available formaldehyde such as hexamethylenetetramine and the like.

The resoles are one-step base catalyzed resins and do not require anything more than heat to effect their cure. A full description of novolak and resole resins is given in "The Chemistry of Phenolic Resins" by R. W. Martin, John Wiley and Sons, New York, N.Y. (1956) and also in "Phenoplasts" by T. S. Carswell, Interscience Publishers, New York, N.Y. (1947). The aforementioned patents and text books are incorporated herein by reference.

Where phenol-aldehyde condensation resins are used in the practice of this invention, it will be readily understood by those skilled in the art that one may also employ such modifiers as drying oils, e.g., castor oil, tung oil, linseed oil, soybean oil, china wood oil, and the like; elastomers including both natural and synthetic rubbers; thermoplastic resins, e.g., polyvinyl butyral, polyhyroxy ethers (Bakelite phenoxy resins), polyvinyl acetate, and the like; epoxy resins, e.g., epoxidized novolaks, bisphenol-A/epichlorohydrin condensation products, and the like.

Mixing of the friction material and binder can be accomplished in any convenient manner so long as there is attained a thorough admixture of the components. Suitable apparatus for accomplishing this end includes a kneader, a 2-roll mill, a Banbury mixer, an extruder, and the like. The compositions of this invention can be molded into friction elements by conventional techniques such as those described in the examples. For example, the composition can be hot compression molded and directly cured in a suitably shaped mold into a friction element. If desired a friction composition can be sold as such to a manufacturer of friction elements.

The improved friction compositions of this invention can be readily formed into improved friction elements such as clutch facings, disc pads, truck blocks, and brake linings for use in all types of manual and power driven vehicles such as railway cars, wagons, carriages, automobiles, buses, airplanes, tractors, trailers, trucks, trains, and the like. The improved friction elements of this invention are particularly useful as brake linings for power and manual brakes in automobiles.

The invention is further described in the examples which follow. All parts and percentages are by weight unless otherwise specified.

The compositions in these examples were prepared by a dry mix process. In this process the dry ingredients are thoroughly mixed in a paint shaker using a friction top can containing several rubber stoppers. The rubber stoppers are preferred as mixing aids for minimal asbestos fiber breakdown.

The above-described thermosetting frictional compositions can also be prepared by wet processes, such as rolling, extrusion, or saturation where the said resin binders are added in a liquid vehicle. To those skilled in the art, such compositions when properly dried, formed and cured will also afford useful finished frictional elements.

EXAMPLE 1

The following ingredients were mixed as described above.

| Material: | Composition, parts by weight |
| --- | --- |
| Asbestos fiber (7D 24 grade) | 60 |
| Barytes (barium sulfate filler) | 20 |
| Arylimide resin binder | 20 |

The arylimide binder resin used above was prepared as follows:

To a 2 liter, 4 neck flask equipped with a Dean-Stark trap, condenser, nitrogen inlet tube and thermometer was was added 110.0 grams (1.008 moles) p-aminophenol and 500 ml. of toluene. The system was purged with nitrogen and 400 ml. of dimethylsulfoxide added. The system was purged again with nitrogen and 81.5 grams (1.05 moles) of 49.15% aqueous sodium hydroxide added. The solution was heated to 110–120° C. and water removed via the toluene/water azetrope. After complete dehydration (approximately 4–5 hours), toluene was removed until the pot temperature reached 135° C.

A concentrated solution of Aroclor 5460 (274 grams) (0.5 mole) in 250 ml. of hot toluene was added via an additional funnel. The remaining toluene was then distilled off. The pot was heated to 160° C. and maintained 1 hour before cooling to room temperature.

At room temperature, the reaction mixture was vacuum filtered to remove sodium chloride and coagulated. Coagulation was accomplished by pouring the filtrate slowly into distilled water (1 to 10 of water) contained in a 3 liter blender and stirred at a high speed. Vacuum filtration through a fritted glass funnel afforded a dark colored polyamine. The polyamine was washed further with hot distilled water, then dried at 60° C. under vacuum.

The dried polyamine (76% yield) was dark brown in color and had a titrated amine equivalent of 365. The chlorine content by elemental analysis was 36.2%. The mass spectrum indicated the product was composed of 9 amines:

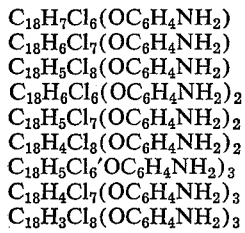

$C_{18}H_7Cl_6(OC_6H_4NH_2)$
$C_{18}H_6Cl_7(OC_6H_4NH_2)$
$C_{18}H_5Cl_8(OC_6H_4NH_2)$
$C_{18}H_6Cl_6(OC_6H_4NH_2)_2$
$C_{18}H_5Cl_7(OC_6H_4NH_2)_2$
$C_{18}H_4Cl_8(OC_6H_4NH_2)_2$
$C_{18}H_5Cl_6{'}OC_6H_4NH_2)_3$
$C_{18}H_4Cl_7(OC_6H_4NH_2)_3$
$C_{18}H_3Cl_8(OC_6H_4NH_2)_3$

To a three liter, three neck flask equipped with a nitrogen inlet tube, stirrer and thermometer was charged 1.36 equivalents of Aroclor 5460 diamine prepared above and 1.5 liters of dimethylacetamide.

Solution was effected under nitrogen while cooling to 0° C. Maleic anhydride (1.37 mols) was added while maintaining a temperature of about 15° C. The solution was then stirred for approximately 1 hour at 15–25° C., after which acetic anhydride (1.39 mols) and sodium acetate (1.3 mols) were added. Stirring was continued for 4–5 hours at room temperature.

The arylimide resin binder was isolated from solution via coagulation in 10 parts of water. The tan powdery filter cake was water washed until neutral and then vacuum dried at 85° C. to a constant weight. The yield was 600 grams. This product had a molecular weight of about 850 and is used as such.

The mixture of asbestos, barytes, and resin binder described above was charged to a semi-positive, fixed volume mold cavity to give a molded plaque 2″ x 6″ x 5/16″ thick with a density of 2.0 grams per cubic centimeter. Molding conditions were 30 minutes at 430° F. followed by 90 minutes at 520° F. all under a pressure of about 4000 p.s.i. After postcuring the plaques in an air circulating oven for about 4 hours at 530° F., four 1″ x 1″ test specimens were cut from the center of the 2″ x 6″ plaque area.

Laboratory friction testing was conducted using a High Output Friction Test Machine manufactured by Greening Associates, Detroit, Mich. The mechanism and principle of operation of this machine is very similar to that of the "Chase" drum test machine described in the SAE J–661 Brake Lining Quality Control Test Procedure. Essentially, the machine is a button-type tester. The loaded specimen (1″ square by 0.25 inch thick) is held stationary against the rotating test drum and the friction force is noted on a recorder. Mounted between the test drum and variable speed drive motor are the slip rings and brushes for the drum thermocouple. External heaters and controls are provided to obtain a standard drum heating rate. Forced air cooling and controls are also provided to obtain a standard drum cooling rate. The instrument panel includes recorders for measurement of frictional force and drum temperature, cycle timer, tachometer and associated on-off controls. With this machine, friction characteristics under conditions of both constant input (constant applied force) and constant output (constant friction force) can be determined.

Because constant input test conditions are significantly different from those encountered in vehicle use, a new friction test method was developed as a continuous drag-constant output test. This test provides a means for determining the coefficient of friction under conditions of continuous drag (rubbing), constant friction force, and constant speed over a drum temperature range of 200° F. to about 900° F. Because both the speed and friction force are constant, the power absorption or rate of work done on the test sample is also constant. By keeping the test duration essentially constant, the work done on each test specimen is therefore the same. This allows for a more meaningful comparison of the wear resistance, as measured by percent wear loss of differently formulated specimens. A description of the three runs involved in this test is as follows:

(1) Initial base line at 200° F.—20 cycles; 10 seconds on-20 seconds off—constant speed of 20 f.p.s. (feet per second), constant applied pressure of 150 p.s.i.

(2) Continuous drag-constant output.—Constant friction force of 35 pounds—constant speed of 20 f.p.s.—power absorption constant at 1.27 horsepower—test duration held at 19 to 20 minutes—drum temperature range of 200° F. to about 900° F. using standard SAE J–661 drum heating rate.

(3) Final base line at 200° F.—20 cycles; 10 seconds on-20 seconds off—constant speed of 20 f.p.s.—constant applied pressure of 150 p.s.i.

Prior to testing, the test drum surface was cleaned and finished with No. 320 grit sandpaper. The 1″ x 1″ test specimens were prepared by first grinding the surface and then run-in at 15 f.p.s. with a maximum drum temperature of 200° F. After testing, sample wear loss was reported as the average percent weight and thickness loss.

The test specimens prepared as above when evaluated in the above-described continuous drag-constant output test with a constant friction force of 35 p.s.i. and a drum speed of 417 r.p.m. (20 f.p.s.) showed no fade up to about 700° F. as demonstrated in the figure and an average wear (average of weight and thickness loss) of about 2.8%.

CONTROL A

Example 1 was repeated with the exception that 20 parts of a pulverized phenol-formaldehyde two-step novolak resin containing 6.5% hexamethylenetetramine hardener, sold under the designation BRP by the Union Carbide Corporation was used in place of the arylimide, 10 parts rather than 20 parts of barytes was used and 10 parts of Cardolite NC111 was used. The mold cure conditions were 15 minutes at 300° F. under a pressure of 2000 p.s.i. with a post cure of 4 hours at 300° F. followed by a final 4 hours at 360° F. The test specimens in the continuous drag-constant output test showed a fade temperature of about 600° F. and an average wear of 10%. The inferiority of this control to the Example 1 composition can be seen to be even more pronounced in the accompanying figure showing friction performance test curves which represents a plot of coefficient of friction as the ordinate versus drum temperature as the abscissa.

EXAMPLE 2

Example 1 was repeated with the exception that only 10 parts of barytes was used and in addition 10 parts of Cardolite NC111 was added. The mold cure conditions were the same except that the post cure of 4 hours at 530° F. was omitted. There was no fade with specimens made from this composition up to about 700° F. and the average wear was 5.5%. The friction performance curve shown in the figure also indicates the superiority of this composition to that of Control A.

EXAMPLE 3

Example 1 was repeated with the exception that 3 parts of arylimide resin was used in conjunction with 17 parts of the phenol-aldehyde resin used in Control A. The cure conditions for preparation to the test specimen were 15 minutes at 300° F. under a pressure of 2000 p.s.i., a post cure of 4 hours at 300° F. followed by 4 hours at 360° F. There was no fade up to a temperature of about 700° F. of the test specimens made from this composition. The average wear of the test specimens was 3.7%.

EXAMPLES 4–6

When Example 1 is repeated with the exception that arylimides derived from hexachlorobenzene, Aroclor 1242 (42% chlorinated biphenyl) or Aroclor 1254 (54% chlorinated biphenyl) are used, comparable frictional element test results are obtained.

EXAMPLE 7

When Example 1 is repeated with the exception that the arylimide is prepared from a complex amine derived from bisphenol A, p-aminophenol and Aroclor 5460, comparable friction element test results are obtained.

The preparation of this arylimide is described below.

To a five liter, four necked flask fitted wtih a thermometer, stainless steel gas inlet tube, Barrett tube, condenser and stirrer was charged 228.28 grams (1.0 mole) of bisphenol A (4,4 - bis(p - hydroxyphenyl)propane), 114.60 grams (1.05 moles) of p-aminophenol, 822.0 grams (1.50 moles) of Aroclor 5460 (trademark of Monsanto Chemical Company for a 60% by weight chlorinated terphenyl), 1350 ml. of N-methylpyrrolidinone and 1800 ml. of xylene. The mixture was purged for 15 minutes with nitrogen and then heated to reflux. At reflux, 246.3 grams (3.025 moles) of 49.15% sodium hydroxide solution was added dropwise over a 60–70 minute period. Water was removed azeotropically during the addition and the pot temperature maintained at 150° C. Dehydration was continued until no water was present in distillate. At this point, xylene was distilled over until a pot temperature of 170° C. was reached.

At room temperature, 103.0 grams (1.05 moles) of maleic anhydride was added to the pot. One hour later, 107.2 grams (1.05 moles) of acetic anhydride and 41 grams (0.5 mole) of sodium acetate was added and stirring continued for an additional four hours, before isolation of the product.

Recovery was accomplished by coagulation from 10 parts water and vacuum filtration. The resin was slurried in water, filtered and dried in a vacuum oven for 48 hours. The coagulated powder was gold in color. The yield was 1134 grams (9.77%). This product had a molecular weight of 2270.

EXAMPLES 8–9

When Example 1 is repeated with the exception that the arylimide is prepared from a diamine and Nadic anhydride or methyl Nadic anhydride, comparable frictional element test results are obtained.

Although the invention has been described in its preferred forms with a certain degree of particularity, it is understood that the present disclosure of these preferred forms have been made only by way of example and that numerous changes may be resorted to without departing from the spirit and scope of the invention.

What is claimed is:

1. Thermosetting friction compositions comprising a major proportion by weight of particulate friction material, a binding amount sufficient to bind together said particulate friction material of a thermosetting arylimide binder having the formula:

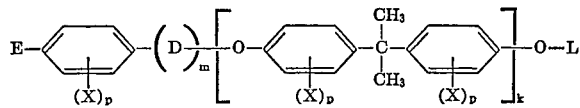

wherein D is a radical selected from the group consisting of

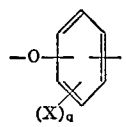

or

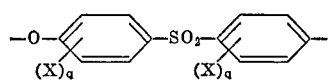

wherein L is a radical selected from the group consisting of

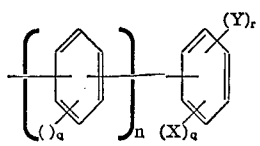

or

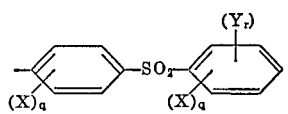

wherein Y is a radical having the formula:

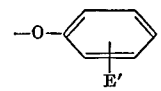

wherein each of E and E' is a monovalent radical selected from the group consisting of:

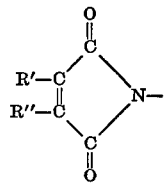

or

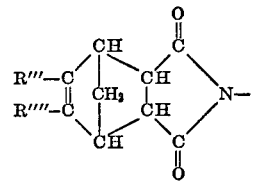

wherein
each of R', R'', R''', and R'''' is a monovalent radical selected from the group consisting of H, lower alkyl or Cl,
$m$ is an integer having values of 0 to 5,
$k$ is an integer having values of 0 to 1,
X is a halogen selected from the group consisting of F, Cl or Br,
each of $q$ and $p$ is an integer having values of 0 to 4 and $r$ is 1 with the proviso that $q+r\not> 5$, and
$n$ is an integer having values of 0 to 3
and 0 to about 40% by weight of a phenol-aldehyde condensation resin based on the total weight of said thermosetting friction composition.

2. Composition claimed in claim 1 wherein D

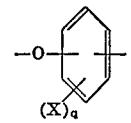

3. Composition claimed in claim 2 wherein X is Cl, $m$ and $k$ are each 1 and $q$ is 4.

4. Composition claimed in claim 2 wherein X is Cl, $m$ is 2, $k$ is 1 and $q$ is 4.

5. Composition claimed in claim 1 wherein X is Cl, $q$ is 4 and $k$ is 0.

6. Composition claimed in claim 1 wherein each of E and E' is

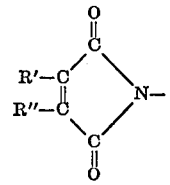

7. Composition claimed in claim 6 wherein each of R' and R'' is H.

8. Composition claimed in claim 1 wherein each of E and E' is

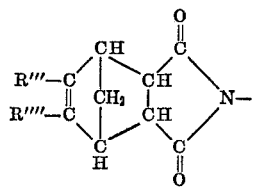

9. Composition claimed in claim 1 containing about 51 to about 95% by weight of particulate friction material based on the total weight of the composition.

10. Composition claimed in claim 1 containing about 5 to about 49% by weight of thermosetting arylimide binder based on the total weight of the thermosetting friction composition.

11. Composition claimed in claim 10 containing about 5% to about 30% of phenol-aldehyde condensation resin based on the total weight of the thermosetting friction composition.

12. A friction element fabricated from the composition of claim 1.

13. A friction element fabricated from the composition of claim 10.

14. A friction element fabricated from the composition of claim 11.

15. A brake lining fabricated from the composition of claim 1.

References Cited
UNITED STATES PATENTS

| | | | |
|---|---|---|---|
| 3,651,012 | 4/1972 | Holub | 260—47 UA |
| 3,669,930 | 6/1972 | Asahara | 260—47 CZ |
| 3,287,311 | 11/1966 | Edwards | 260—37 |
| 3,227,249 | 1/1966 | Kuzmick | 188—251 |
| 3,295,940 | 1/1967 | Gerow | 51—298 |
| 3,576,691 | 4/1971 | Meyers | 156—309 |
| 3,627,780 | 12/1971 | Bonnard | 260—326.3 |

ALLAN LIEBERMAN, Primary Examiner

R. ZAITLEN, Assistant Examiner

U.S. Cl. X.R.

106—36; 260—38, 841

UNITED STATES PATENT OFFICE
CERTIFICATE OF CORRECTION

Patent No. 3,761,441      Issue Date September 25, 1973

Inventor(s) William J. D'Alessandro and George L. Brode

It is certified that error appears in the above-identified patent and that said Letters Patent are hereby corrected as shown below:

The formula at column 11 lines 70-75 should read:

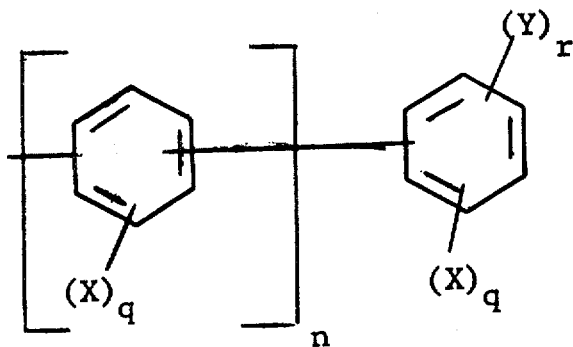

Signed and sealed this 25th day of December 1973.

(SEAL)
Attest:

EDWARD M. FLETCHER, JR.       RENE D. TEGTMEYER
Attesting Officer      Acting Commissioner of Patents